US006795503B2

(12) United States Patent
Nakao et al.

(10) Patent No.: US 6,795,503 B2
(45) Date of Patent: Sep. 21, 2004

(54) VIDEO CODING METHOD AND APPARATUS THAT PREDICTS MACROBLOCK CODE LENGTH

(75) Inventors: Takashi Nakao, Hyogo (JP); Yoshiko Hatano, Tokyo (JP); Junko Kijima, Tokyo (JP); Kazuhiro Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 648 days.

(21) Appl. No.: 09/799,512

(22) Filed: Mar. 7, 2001

(65) Prior Publication Data

US 2002/0006162 A1 Jan. 17, 2002

(30) Foreign Application Priority Data

Jun. 5, 2000 (JP) ........................................ 2000-167590

(51) Int. Cl.[7] .............................. H04N 7/12; G06K 9/36
(52) U.S. Cl. ............. 375/240.16; 375/240; 375/240.03; 375/240.12; 375/240.05; 375/240.15; 382/236
(58) Field of Search ........................ 375/240.01, 240.12, 375/240.16, 240.05, 240.15, 240.03, 240.17; 358/426.12; 348/425.1; 382/236; 708/300

(56) References Cited

U.S. PATENT DOCUMENTS

| 4,797,944 | A | | 1/1989 | Tanaka .......................... 382/246 |
|---|---|---|---|---|
| 5,452,103 | A | * | 9/1995 | Brusewitz .................. 358/426.05 |
| 5,559,557 | A | * | 9/1996 | Kato ........................ 375/240.03 |
| 5,719,631 | A | * | 2/1998 | Pandel ..................... 375/240.15 |
| 5,822,024 | A | * | 10/1998 | Setogawa et al. ......... 348/425.1 |
| 5,881,070 | A | | 3/1999 | Hoshi .......................... 714/752 |
| 5,966,181 | A | * | 10/1999 | Brusewitz .............. 375/240.05 |
| 6,223,193 | B1 | * | 4/2001 | Pau et al. .................... 708/300 |
| 6,414,997 | B1 | * | 7/2002 | Piccinelli et al. ...... 375/240.17 |
| 6,456,659 | B1 | * | 9/2002 | Zuccaro et al. ........ 375/240.16 |
| 6,556,718 | B1 | * | 4/2003 | Piccinelli et al. ........... 382/236 |

OTHER PUBLICATIONS

Ducla–Sores et al., Image Communication, vol. 14, pp. 447–472, (1999).
Gumbrich et al., IBM European Networking Center, pp. 93–103.
Côté et al., Proceedings of 1999 IEEE Canadaian Conference, pp. 739–744, (May 9–12, 1999).
Villasenor et al., IEEE, vol. 87, No. 10, pp. 1724–1733 (1999).

* cited by examiner

Primary Examiner—Chris Kelley
Assistant Examiner—Allen Wong
(74) Attorney, Agent, or Firm—Birch, Stewart, Kolasch & Birch, LLP

(57) ABSTRACT

As the video signals of macroblocks are coded, they are stored in a buffer. When the total code length of the stored macroblocks exceeds a predetermined value, all but the most recently coded macroblock are output from the buffer as a video packet, and the most recently coded macroblock is coded again. To minimize this occurrence, when each coded macroblock is stored, the code length of the next macroblock is predicted and added to the total length, and if the resulting sum exceeds the predetermined value, all of the coded macroblocks stored in the buffer are output as a video packet.

10 Claims, 11 Drawing Sheets

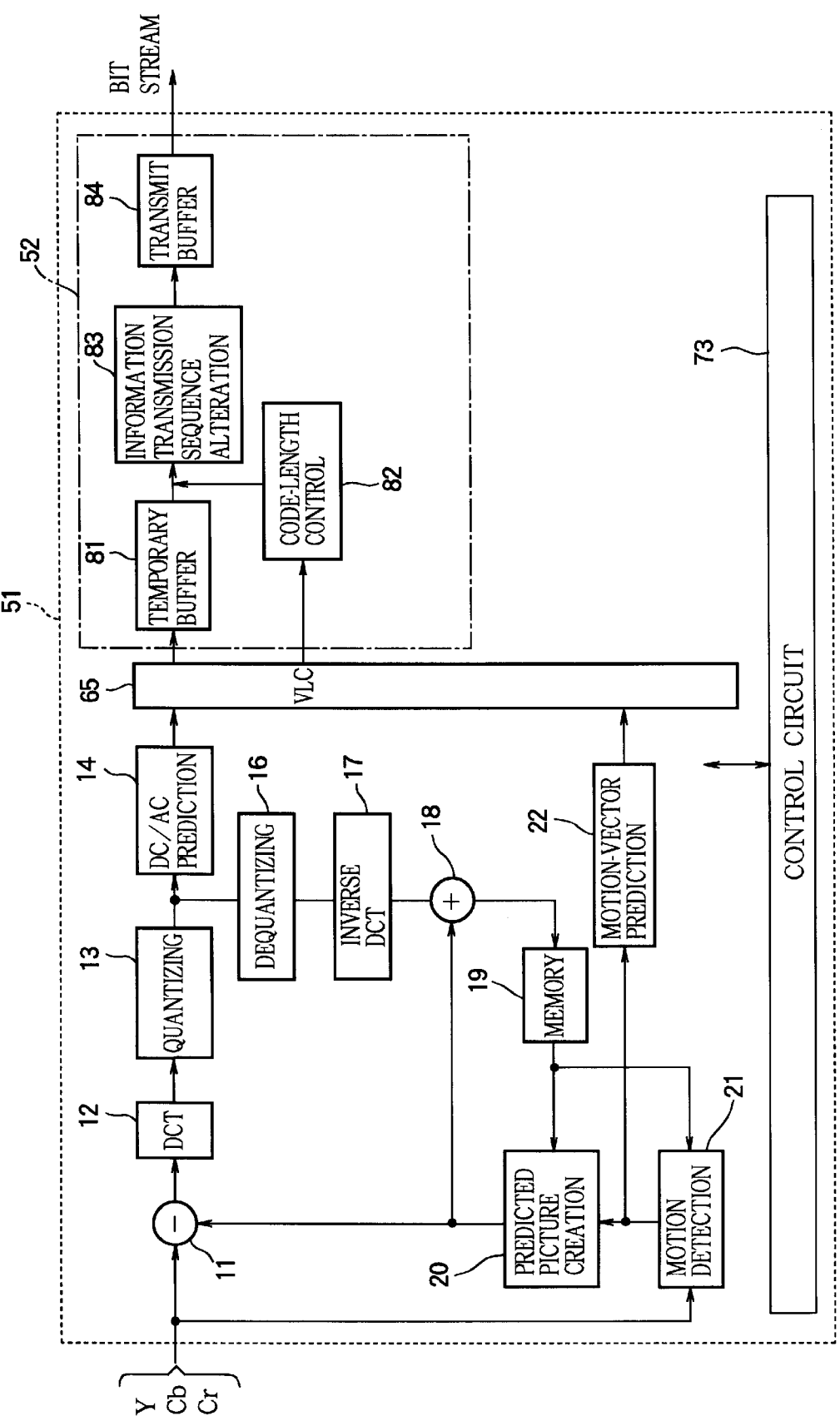

VIDEO CODING METHOD AND APPARATUS THAT PREDICTS MACROBLOCK CODE LENGTH

BACKGROUND OF THE INVENTION

The present invention relates to a coding method and apparatus that codes video signals of a plurality of macroblocks and generates, from the coded video signals, video packets with a code length equal to or less than a certain value, more particularly to a coding apparatus that, when adding the video signals of the macroblock just coded would make the code length of the video packet exceed a limit value, outputs the video-signal code up to the macroblock coded previously for use as a video packet, and recodes the video signals of the macroblock just coded.

Many video-coding systems divide a picture into a large number of rectangular blocks and code each block with reference to spatially neighboring blocks in the same picture. For example, a block may be coded by predicting the content of the block from the contents of neighboring blocks that have already been coded, and coding the difference between the predicted content and the actual content. Alternatively, the motion vector of a block may be predicted and coded in this way. Motion vectors are employed when the content of a block is predicted from a block in a preceding or following picture, a process referred to as inter-coding.

For brevity, the term 'predict' will sometimes be used below to denote both predicting a value and taking the difference between the predicted value and the actual value.

In color video coding, a macroblock is a group of luminance and chrominance blocks occupying the same picture area. All blocks in the macroblock are coded in the same way, for example, by use of the same motion vector. The coded length of a macroblock, referred to below as the code length, is highly variable, depending on the content of the macroblock and how closely it can be predicted.

For transmission over communication links, coded video signals are often divided into packets, referred to herein as video packets. A video packet has a length that does not exceed a fixed limit, and includes a variable number of coded macroblocks. To reduce the propagation of errors due to lost or corrupted video packets, the macroblocks in a video packet are not coded with reference to spatially neighboring macroblocks in other video packets.

In a conventional coding system, a video packet is assembled by storing coded macroblocks one by one in a buffer until the total code length of the stored macroblocks reaches or exceeds a predetermined threshold value. If the total code length at this point is still within the video-packet limit, all of the coded macroblocks in the buffer are output as a video packet. If the total code length exceeds the video-packet limit, all but the last coded macroblock are output as a video packet, and the last macroblock is saved for inclusion in the next video packet. If the last macroblock was coded with reference to any of the macroblocks just output, however, it is coded again, this time without reference to those macroblocks, before being placed in the next video packet.

A problem in this system is that if the threshold value is set high enough to avoid wasting available video-packet space, the last macroblock will often fail to fit into the video packet, and will have to be recoded. This frequent repeated coding lowers the efficiency of the coding process.

A conventional coding system based on the MPEG-4 standard will now be described in more detail, to provide necessary background for the later description of an embodiment of the invention.

The MPEG-4 standard is a standard devised by the Moving Picture Experts Group of the ITU-T (Telecommunication Standardization Sector of the International Telecommunications Union). It was preceded by the MPEG-1 and MPEG-2 standards. The MPEG-1 standard is applied in CD-ROM, and is also used in video CD and karaoke, and in video communication over networks. The MPEG-2 standard is applied in existing television and HDTV, or in stored-media systems and communication systems.

A feature of the MPEG-4 standard that can be mentioned in contrast to the MPEG-1 and MPEG-2 standards is that it uses differing constituent elements such as objects and scenes having various characteristics, and the information of those objects and scenes is compressed and coded with variable length independently of the bit rate.

A coding apparatus based on the MPEG-4 standard and an outline of the coding will be described below.

FIG. 8 is a block diagram of a conventional coding apparatus based on the MPEG-4 standard as shown in, for example, the document 'All about MPEG-4' (Kogyo Chosakai), p. 39 to p. 40.

A video object plane (VOP), which is the basic video unit dealt with by MPEG-4, is divided into macroblocks; the video signals (luminance signal Y and color difference signals Cb and Cr) of the macroblocks are input to the coding apparatus 1 of FIG. 8, which outputs, in a bit stream, video packets including the coded video signals. The video packets output from the coding apparatus 1 are stored temporarily in a receive buffer 31 in a decoding apparatus 2, then are decoded by a decoding circuit 32.

The coding apparatus 1 comprises: a subtractor 11 to which the input video signal is input as a first input; a DCT circuit 12 that executes a direct cosine transform (DCT) on the output signal of the subtractor 11; a quantizing circuit 13 that quantizes and outputs the output signal of the DCT circuit 12; a DC/AC prediction circuit 14 that predicts the DC and AC components of the DCT coefficients of the relevant blocks in the video object plane (VOP) to which the-input macroblocks belong; a variable-length coding (VLC) circuit 15 that variable-length-codes the DCT coefficients and motion vectors (described below) of a plurality of macroblocks, divides them into video packets, then outputs them in a bit stream; a dequantizing circuit 16 that dequantizes the DCT coefficients output from the quantizing circuit 13; an inverse DCT circuit 17 that executes an inverse discrete cosine transform on the dequantized DCT coefficients; an adder 18 to which the inverse-discrete-cosine-transformed video signal is input as a first input; a memory 19 that stores the output of the adder 18; a predicted picture creation circuit 20 to which the video signal stored in the memory 19 is input as a first input and the output of a motion detection circuit 21 (described below) is input as a second input, which creates a predicted picture of the next macroblock and outputs it to the subtractor 11 and adder 18; the motion detection circuit 21 to which the video signal stored in the memory 19 is input as a first input and the video signal of a macroblock of interest is input as a second input, which detects the macroblock differing least from the macroblock of interest, outputs it to the predicted picture creation circuit 20, and outputs a motion vector, which is a signal indicating motion toward the detected macroblock, to a motion-vector prediction circuit 22 (described below); the motion-vector prediction circuit 22, which predicts motion vectors; and a control circuit 23 that controls the operation of the above circuits.

The video signals input to the coding apparatus 1 at each macroblock will now be described.

FIG. 9 is a diagram showing the video signals of the individual macroblocks input to the coding apparatus 1 of FIG. 8.

As shown in FIG. 9, a single video object plane (VOP) is divided into a plurality of macroblocks, at intervals of sixteen lines and sixteen pixels. The luminance block Y of each macroblock is further divided into sub-blocks (denoted blocks below) at intervals of eight lines and eight pixels. The color-difference blocks Cb and Cr comprise eight lines and eight pixels. When the picture format of the input video signal is 4:2:0 as in MPEG-4 version 1, the sixteen pixels× sixteen lines of the luminance signal (Y) has the same size on the screen as the eight pixels×eight lines of the two color-difference signals (Cb, Cr). A single macroblock accordingly comprises six blocks of eight pixels×eight lines (8×8 blocks). The VOP in FIG. 9 has a rectangular shape, and is synonymous with a frame in MPEG-2, for example.

The macroblock shown in FIG. 9 is disposed in the highest and leftmost position in the VOP. For example, if the topmost row of macroblocks in the VOP in FIG. 9 is the first row and the rest, proceeding toward the bottom, are the second row, third row, . . . , and if the leftmost column of macroblocks in the VOP in FIG. 9 is the first column, and the rest, proceeding toward the right, are the second column, third column, . . . , then the macroblock shown in FIG. 9 is the macroblock positioned in the first column and first row.

Processing in the DCT circuit 12, quantizing circuit 13, DC/AC prediction circuit 14 etc. is performed in the 8×8 block units described above.

Next, the operation of the coding apparatus 1 in FIG. 8 will be described.

The video signals (luminance signal Y, color-difference signals Cb/Cr) of the macroblocks input to the coding apparatus 1 undergo a discrete cosine transform (DCT) in the DCT circuit 12 and quantization in the quantizing circuit 13 for each 8×8 block. The DC component and AC components of the DCT coefficients of each quantized 8×8 signal block are predicted in the DC/AC prediction circuit 14.

For intra-coding, the DC/AC prediction circuit 14 predicts the DC and AC components of the quantized DCT coefficients and passes them to the variable-length coding circuit 15; for inter-coding, it passes the quantized DCT coefficients output from the quantizing circuit 13 to the variable-length coding circuit 15 without prediction.

The detailed operation of the DC/AC prediction circuit 14 in the case of intra-coding will now be described further, with reference to the drawings.

FIG. 10 is an enlarged drawing of the 8×8 luminance-signal blocks in a macroblock.

Because the DC/AC prediction circuit 14 processes 8×8 blocks, the macroblock in FIG. 10 comprises 8×8 luminance-signal blocks A, B, C, and X. The bottom-right 8×8 block in the macroblock is the block X now being processed in the DC/AC prediction circuit 14; the bottom-left 8×8 block in the macroblock in FIG. 10 is the left adjacent block A positioned to the left of the block X now being processed; the top-right 8×8 block in the macroblock in FIG. 10 is the upper adjacent block C positioned adjacently above the block X now being processed; and the top-left 8×8 block in the macroblock in FIG. 10 is the upper left block B.

In DC/AC prediction for intra-coding, first, the prediction direction of the DC component is determined. For example, if the quantized DCT coefficients of the block X which is now being coded are $Fx(i, j)$ ($0 \leq i \leq 7, 0 \leq j \leq 7$), the quantized DCT coefficients of the left adjacent block A of block X are $Fa(i, j)$ ($0 \leq i \leq 7, 0 \leq j \leq 7$), the quantized DCT coefficients of the upper adjacent block C of block X are $Fc(i, j)$ ($0 \leq i \leq 7, 0 \leq j \leq 7$), and the quantized DCT coefficients of the upper left block B of block X are $Fb(i, j)$ ($0 \leq i \leq 7, 0 \leq j \leq 7$), then the prediction direction is determined from the DC component $Fb(0, 0)$ of the quantized DCT coefficients of block B, the DC component $Fa(0, 0)$ of the quantized DCT coefficients of block A, and the DC component $Fc(0, 0)$ of the quantized DCT coefficients of block C.

To determine the prediction direction of the DC component, for example, if the quantization step width of the DC component of block A is Qda, the quantization step width of the DC component of block B is Qdb, and the quantization step width of the DC component of block C is Qdc, then the dequantized DC components $fa(0, 0)$, $fb(0, 0)$, $fc(0, 0)$ are found from the following three equations:

$$fa(0, 0) = Fa(0, 0) \times Qda$$

$$fb(0, 0) = Fb(0, 0) \times Qdb$$

$$fc(0, 0) = Fc(0, 0) \times Qdc$$

If the following relationship holds among these DC components $fa(0, 0)$, $fb(0, 0)$, $fc(0, 0)$, then the DC component of block X is predicted from the dequantized DC component $fc(0, 0)$ of block C.

$$|fa(0, 0) - fb(0, 0)| < |fb(0, 0) - fc(0, 0)|$$

Conversely, if the above relationship does not hold, the DC component of block X is predicted from the dequantized DC component fa of block A.

The predicted DC component $Px(0, 0)$ is found as follows: if predicted from of block C, the DC component is $$Px(0, 0) = Fx(0, 0) - fc(0, 0)/Qdx$$

and if predicted from block A, the DC component is $$Px(0, 0) = Fx(0, 0) - fa(0, 0)/Qdx,$$

where Qdx is the quantization step width of the DC component of block X, and the results of the above division operations are rounded off.

Next, the AC components are predicted, using the same prediction direction as for the DC component. If the quantization parameter of block A is Qpa, the quantization parameter of block C is Qpc, the quantization parameter of block X is Qpx, and the DC component was predicted from block C, then $$Px(i, 0) = Fx(i, 0) - (Fc(i, 0) \times Qpc)/Qpx (i=1, \ldots, 7)$$

and if the DC component was predicted from block C, then $$Px(0, j) = Fx(0, j) - (Fa(0, j) \times Qpa)/Qpx (j=1, \ldots, 7)$$

The results of the above division operations are rounded off.

After the above AC components have been predicted independently for each block, whether or not to predict the AC components for each macroblock is determined.

For example, if prediction was performed for an arbitrary block X among the blocks constituting one macroblock on the basis of the upper adjacent block C of that block X, then a quantity SB is determined from the following Equation 1:

$$SB = \sum_{i=1}^{7} |Fx(i, 0)| - \sum_{i=1}^{7} |Px(i, 0)| \quad (1)$$

If prediction was performed on the basis of the left adjacent block A of block X, then SB is determined from the following Equation 2.

$$SB = \sum_{j=1}^{7} |Fx(0, j)| - \sum_{j=1}^{7} |Px(0, j)| \quad (2)$$

If the sum SBS of the SB's of the six blocks constituting one macroblock is non-negative,

SBS≧0 then the predictions of AC components are performed for each block as one block of the six blocks constituting one macroblock, but if SBS is less than zero, the predictions of AC components are not performed as a block in the one macroblock.

An ac_pred_flag is coded in the variable-length coding circuit 15 as additional information for each macroblock; if a prediction of AC components is performed, then ac_pred_flag=1.

For a block X belonging to a macroblock with ac_pred_flag=1, if the AC components were predicted on the basis of the upper adjacent block C of that block X, then output values Ox(i, j) are determined from the following Equation 3.

$$Ox(i, j) = \begin{cases} Px(i, 0) & (i = 0, \ldots, 7; j = 0) \\ Fx(i, j) & (i = 0, \ldots, 7; j = 1, \ldots, 7) \end{cases} \quad (3)$$

If the AC components were predicted on the basis of the upper adjacent block C of that block X, then the Ox(i, j) are determined from the following Equation 4:

$$Ox(i, j) = \begin{cases} Px(0, j) & (i = 0, ; j = 0, \ldots, 7) \\ Fx(i, j) & (i = 1, \ldots, 7; j = 0, \ldots, 7) \end{cases} \quad (4)$$

For a block X belonging to a macroblock with ac_pred_flag=0, the Ox(i, j) are determined from the following Equation 5.

$$Ox(i, j) = \begin{cases} Px(0, 0) & ((i, j) = (0, 0)) \\ Fx(i, j) & ((i, j) \neq (0, 0)) \end{cases} \quad (5)$$

The Ox(i, j) values are output to the variable-length coding circuit 15 as the output of the DC/AC prediction circuit 14.

Now in the above predictions, if the present block is on the left edge of the VOP, then because there is no left adjacent block A and no upper left block B, a predetermined constant β is used in the above predictions as the value of the dequantized DC components fa(0, 0) and fb(0, 0). In this case, the AC components Fa(i, j), Fb(i, j) ((i, j)≠(0, 0)) used in the above predictions are set to zero.

The median value of the range of values of the DC component of the DCT coefficients output from the DCT circuit 12, for example, is used as the above constant β, so that if the DC component output from the DCT circuit 12 is an 11-bit value from 0 to 2047, then β=1024.

Similarly, if the present block X is disposed at the top of the VOP, then because there is no upper adjacent block C and no upper left block B, the above constant β is used in the above predictions as the value of the dequantized DC components fc(0, 0) and fb(0, 0), and the AC components Fc(i, j), Fb(i, j) ((i, j)≠(0, 0)) are set to zero.

Furthermore, if the left adjacent block A of the present block X belongs to a different video packet from the present block X, the above constant β is used in the above predictions as the value of the dequantized DC component fa(0, 0) and the AC components Fa(i, j) ((i, j)≠(0, 0)) are-set to zero.

Similarly, if the upper adjacent block C of the present block X belongs to a different video packet from the present block X, the above constant β is used in the above predictions as the value of the dequantized DC component fc(0, 0) and the AC components Fc(i, j) ((i, j)≠(0, 0)) are set to zero.

Also, if the upper left block B of the present block X belongs to a different video packet from the present block X, the above constant β is used in the above predictions as the value of the dequantized DC component fb(0, 0), and the AC components Fb(i, j) ((i, j)≠(0, 0)) are set to zero.

With this arrangement, even if the transmitted bit stream is corrupted by an error, error propagation due to DC/AC prediction is confined to the video packet, because no reference is made in the DC/AC prediction circuit 14 to the coefficients of DC components and AC components in blocks belonging to different video packets.

The DCT coefficients of the macroblocks output from the DC/AC prediction circuit 14 are input to the variable-length coding circuit 15. The-variable-length coding circuit 15 codes the input signals, together with such additional information as quantization parameters, with variable length and outputs them in a bit stream, divided into video packets of a certain length. The above processing is termed intra-coding. A VOP in which all macroblocks are intra-coded is termed an I-VOP.

Meanwhile, the DCT coefficients output from the quantizing circuit 13 are dequantized in the dequantizing circuit 16, then decoded by an inverse discrete cosine transform in the inverse DCT circuit 17. The decoded video signals are input through the adder 18 to the memory 19. The video signals of the macroblocks stored in the memory 19 are used in inter-coding processing, which codes the difference from the video signal input to the coding apparatus 1.

When inter-coding is performed in the coding apparatus 1, the position of the video signal that differs least from the video signal of the input macroblock is detected in the motion detection circuit 21 from among the macroblocks stored in the memory 19, and a motion vector indicating the motion of the input macroblock with respect to the detected macroblock is detected. A predicted picture is created in the predicted picture creation circuit 20, based on the video signals of the macroblocks stored in the memory 19 and the motion vector detected in the motion detection circuit 21.

The vector values of the motion vectors detected in the motion detection circuit 21 are predicted in the motion-vector prediction circuit 22, and the difference from the predicted value is found.

The detailed operation of the motion-vector prediction circuit 22 will now be described, with reference to the drawings.

FIG. 11 is a diagram showing the motion vector prediction method. The macroblock now being coded is denoted MX. Macroblocks MA, MC, and MD are, respectively, the macroblocks to the left of, above, and above and to the right of the present macroblock MX.

If the motion vector of the present macroblock MX is MV=(MVx, MVy), the motion vector of macroblock MA is MV1=(MV1x, MV1y), the motion vector of macroblock MC is MV2=(MV2x, MV2y), and the motion vector of macroblock MD is MV3=(MV3x, MV3y), then the predicted value PV=(PVx, PVy) of the motion vector of macroblock MX can be found from PVx=Median(MV1x, MV2x, MV3x)

PVy=Median(MV1y, MV2y, MV3y)

where Median is a function that outputs the median value of a plurality of input values.

In the above calculation, if any one of macroblocks MA, MC, MD is outside the VOP, the calculation is performed as if the motion vector of that macroblock were (0, 0).

Moreover, if any two of macroblocks MA, MC, MD are outside the VOP, the motion vector of the remaining one macroblock in the VOP becomes the predicted value PV.

Furthermore, if macroblocks MA, MC, MD are all outside the VOP, the predicted value PV is (0, 0).

Also, in the above calculation, if any one of macroblocks MA, MC, MD belongs to a different video packet from the present macroblock MX, the calculation is performed as if the motion vector of that macroblock were (0, 0).

Moreover, if any two of macroblocks MA, MC, MD belong to a different video packet from the present macroblock MX, the motion vector of the remaining one macroblock belonging to the same video packet becomes the predicted value PV.

Furthermore, if macroblocks MA, MC, MD all belong to a different video packet from the present macroblock MX, the predicted value PV is (0, 0).

The motion-vector prediction circuit 22 outputs the difference between the motion vector MV of the present macroblock and the above predicted value PV, which is MV−PV=(MVx−PVx, MVy−PVy)

to the variable-length coding circuit 15.

The predicted picture output from the predicted picture creation circuit 20 is input to the subtractor 11, and the difference signal of the video signal of the input macroblock and the predicted picture is output from the subtractor 11. DCT processing is performed on that difference signal in the DCT circuit 12, and quantization processing is performed in the quantizing circuit 13. The quantized DCT coefficients of the difference signal, together with such additional information as the motion vector predicted in the motion-vector prediction circuit 22 and the quantization parameters, are coded in the variable-length coding circuit 15. The DCT coefficients of the difference signal output from the quantizing circuit 13 are also dequantized in the dequantizing circuit 16, and inverse DCT processing is executed in the inverse DCT circuit 17 to recover the difference signal. The difference signal output from the inverse DCT circuit 17 is added in the adder 18 to the predicted picture output from the predicted picture creation circuit 20, and is stored in the memory 19.

Inter-coding includes unidirectional prediction, which creates the predicted picture only from a VOP that temporally precedes it in the display sequence of the pictures, and bidirectional prediction, which creates the predicted picture from both temporally preceding and following VOPs. A VOP coded using unidirectional prediction is termed a P-VOP; a VOP coded using bidirectional prediction is termed a B-VOP.

If the variable-length coding circuit 5 of the above coding apparatus 1 performs coding processing using, for example, a reversible variable-length code, the decoding circuit 32 in the decoding apparatus 2 may perform variable-length decoding in the reverse direction, from the end of a video packet, as well as variable-length decoding in the normal forward direction. More specifically, if a reversible variable-length code is used in the signal received by the decoding apparatus 2, and if an error occurs in variable-length decoding in-the forward direction, the decoding circuit 32 will perform variable-length decoding in the reverse direction, from the end of the video packet. In this case, it becomes necessary for the decoding apparatus 2 to store the full amount of code of the received video packet temporarily in the receive buffer 31.

The memory capacity of the receive buffer 31 in the decoding apparatus 2 is finite, however, and the memory capacity is frequently prescribed when the decoding apparatus 2 is designed or manufactured. A limit may therefore be imposed on the length (code length) of the video packets output from the variable-length coding circuit 15, so that it does not exceed the memory capacity of the receive buffer 31. Accordingly, if the variable-length coding circuit 5 uses a reversible variable-length code and the memory capacity of the receive buffer 31 is prescribed as above, it is necessary for the coding apparatus 1 to control the code length of the output video packets so that it is equal to or less than a certain length not exceeding the memory capacity of the receive buffer 31.

As a means by which the coding apparatus 1 may control the code length of the video packets, a means that judges the code length after the variable-length coding circuit 15 has sequentially coded the video signals of a plurality of macroblocks, before they have been output as a video packet, might be considered. When this means judges that the length of the video packet overruns the certain length, it will perform control so that the video-signal code of the overrunning macroblock is included in a new video packet.

As noted in FIG. 10, however, the DC/AC prediction circuit 14 determines the correlation relationships between the block X now being processed and the vertically upper block C and left adjacent block A, and if the block X now being processed is placed in a new video packet at that time, it is necessary to predict the DCT coefficients of the block X now being processed by regarding the DCT coefficients of the vertically upper block C and the DCT coefficients of the left adjacent block A as a constant (e.g., 1024). In inter-coding, also, as noted using FIG. 11, if macroblock MX is included in a new video packet, the motion-vector prediction circuit 22 must modify the predicted vector by setting the predicted value PV to (0, 0), because the left adjacent macroblock MA, the upper adjacent macroblock MC, and the upper right macroblock MD do not belong to the same video packet.

It may also happen that when the video packet changes, the code length of each block in the macroblock changes, and the code length of the overrunning blocks coded this time differs from the code length of the blocks included in the new video packet. In summary, the code of the overrunning blocks coded this time cannot be included as is in the new video packet.

Accordingly, when the video signal of the overrunning macroblock is to be included in the new video block, before coding is executed by the variable-length coding circuit 15, the video signal of the macroblock must be predicted again, using constants, in the DC/AC prediction circuit 14, and the prediction of the motion vector must be performed again in the motion-vector prediction circuit 22.

In the conventional coding apparatus 1 based on the MPEG-4 standard, however, no consideration whatsoever is given to controlling the code length of the video packets when there is a length limit on the video packets output in a bit stream from the variable-length coding circuit 15; the problem was that if the next video packet is simply generated from a judgement as to whether or not the code length is within a certain length, coding efficiency may be lowered because of the need for reprocessing of prediction and coding in regard to the video signals of the overrunning macroblock.

SUMMARY OF THE INVENTION

An object of present invention is to provide a video coding method and apparatus that can minimize the loss of coding efficiency due to limited video-packet length.

The invented coding method codes the video signals of macroblocks for output in video packets of limited length. Each macroblock is coded by use of a variable-length code, and the coded macroblocks are stored successively in a buffer. When each coded macroblock is stored in the buffer, the resulting total code length of the coded macroblocks stored in the buffer is calculated and compared with a predetermined value related to the limited video-packet length.

If the total code length exceeds the predetermined value, all but the most recently coded macroblock are output from the buffer as a video packet. The most recently coded macroblock is coded again.

If the total code length is less than the predetermined value, the code length of the next macroblock is predicted, the predicted code length is added to the total code length, and the resulting sum is compared with the predetermined value. If the sum exceeds the predetermined value, all of the coded macroblocks stored in the buffer are output as a video packet.

This scheme greatly reduces the frequency with which a macroblock has to be coded again because it will not fit into the current video packet. Coding efficiency is thereby improved.

The coding process may include the prediction of macroblock contents or motion vectors, the prediction being repeated when the coding is repeated.

The length of the most recently coded macroblock may be used as the predicted code length of the next macroblock.

Data partitioning may be used to rearrange the coded macroblock data in the video packets.

The invention also provides coding apparatus employing the invented method.

BRIEF DESCRIPTION OF THE DRAWINGS

In the attached drawings:

FIG. 1 shows a coding apparatus embodying the present invention;

DETAILED DESCRIPTION OF THE INVENTION

Figure 2A:
FIGS. 2A, 2B, 2C, and 2D show the structure of the bit stream when the code of the video signals in the macroblocks of one VOP are output in video packets.

The invention will be described below on the basis of the illustrated embodiment.

FIG. 1 shows a coding apparatus 51 embodying the present invention. Those parts in FIG. 1 with the same functions as in the conventional coding apparatus 1 shown in FIG. 8 have the same reference characters, and redundant descriptions will be omitted.

Figure 8:
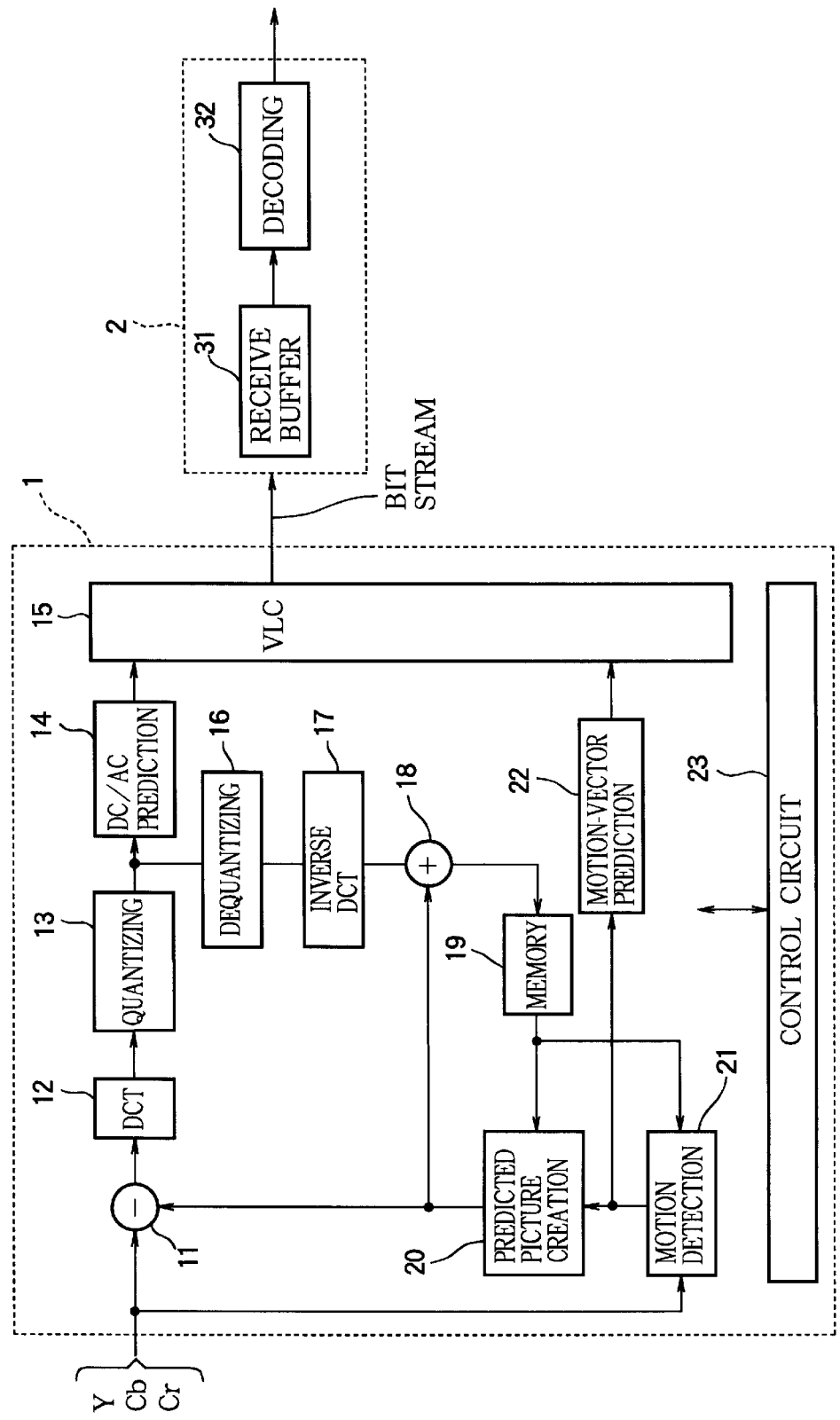
FIG. 8 is a block diagram of a conventional coding apparatus based on the MPEG-4 standard.

The principal way in which the coding apparatus 51 of FIG. 1 differs from the coding apparatus 1 shown in FIG. 8 is that there is a packet code-length control unit 52 following the variable-length coding circuit 65 in the coding apparatus 51.

The packet code-length control unit 52 comprises a temporary buffer 81 that temporarily stores the code output from the variable-length coding circuit 65, an information transmission sequence alteration circuit 83 that performs data partitioning by rearranging the order in which the code stored in the temporary buffer is output, a transmit buffer 84 that adds headers and the like to the input code and outputs video packets in a bit stream, and a code-length control circuit 82 that controls the code length for a video packet by controlling the time of output of the code stored in the temporary buffer 81, and regarding to the code of the video signals of a macroblock that is not output, has the prediction of DCT coefficients and the coding executed again, through the control circuit 73.

The variable-length coding circuit 65 has two outputs: the first output is input to the temporary buffer 81; the second output is input to the code-length control circuit 82. The first output is the DCT coefficients coded by the variable-length coding circuit 65: the second output is the code length of the above coded DCT coefficients.

Now the video packets output as a bit stream will be described.

Figure 9:
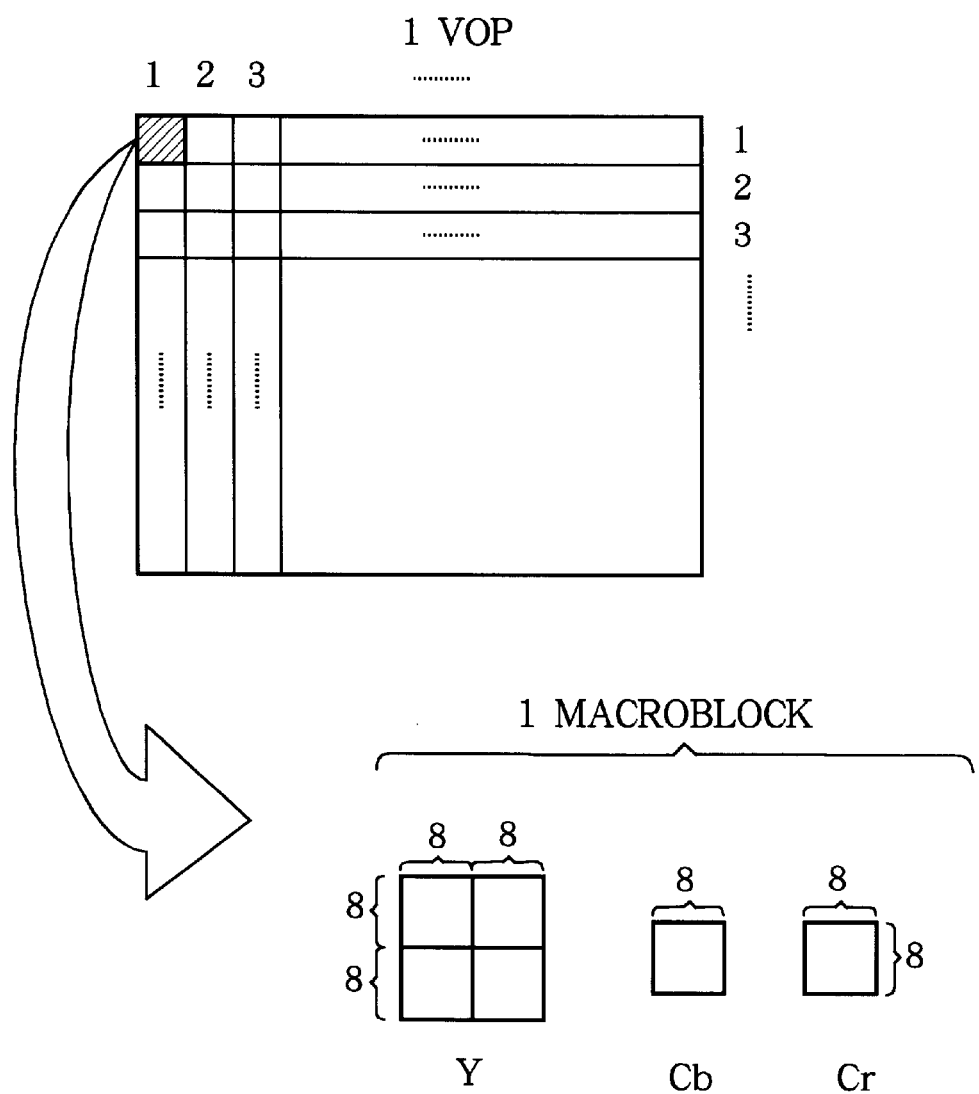
FIG. 9 is a diagram showing the video signal of the individual macroblocks input to the coding apparatus of FIG. 8.
Figure 10:
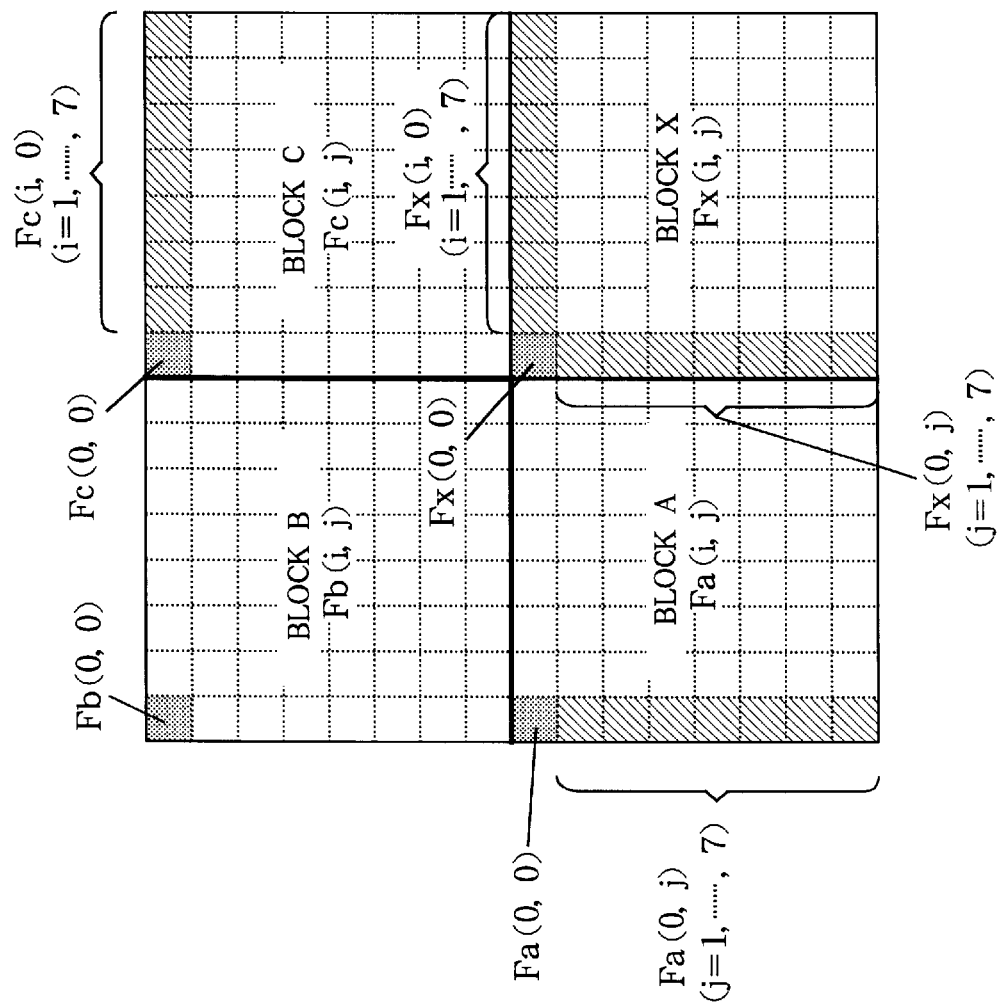
FIG. 10 is an enlarged drawing of 8×8 blocks in a macroblock.
Figure 11:
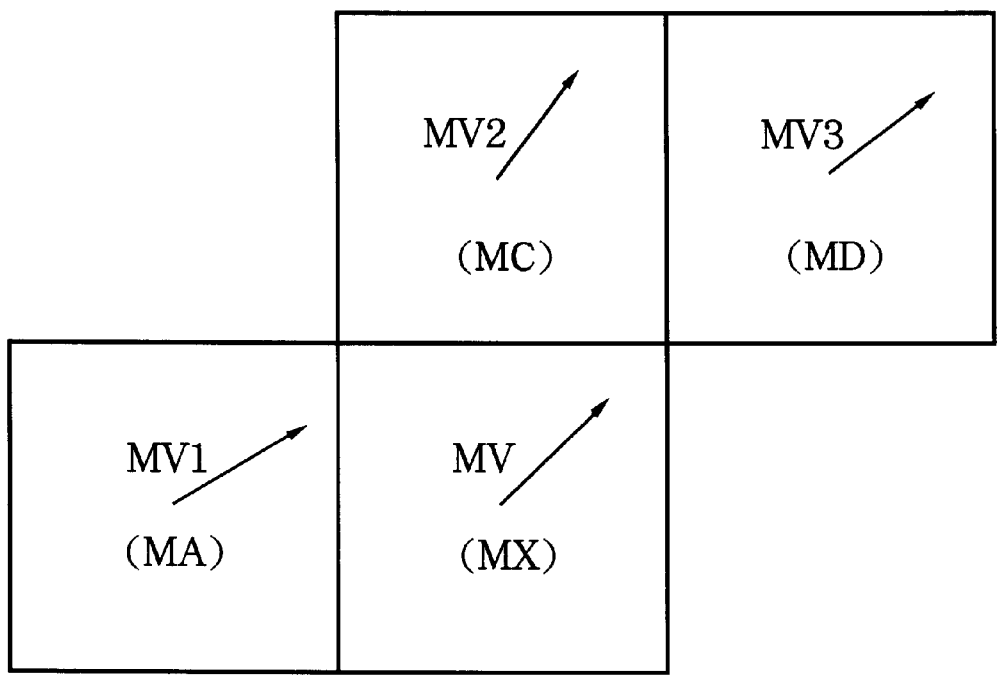
FIG. 11 illustrates a motion vector prediction method.

FIGS. 2A to 2D illustrate the structure of the bit stream when the code of the video signals in the macroblocks of one VOP, as shown in FIG. 9, is output in video packets.

FIG. 2A shows the bit stream when the code of the video signals of the macroblocks in one VOP is output as seven consecutive video packets VP (0) to VP(7). The video packets are output in sequence in the bit stream: for example, the leftmost video packet VP(0) is output from the coding apparatus 51, followed by video packet VP(1), and video packet VP(6) is output last. As shown in this FIG. 2A, the bit stream of one VOP comprises one or more video packets.

Figure 2B:
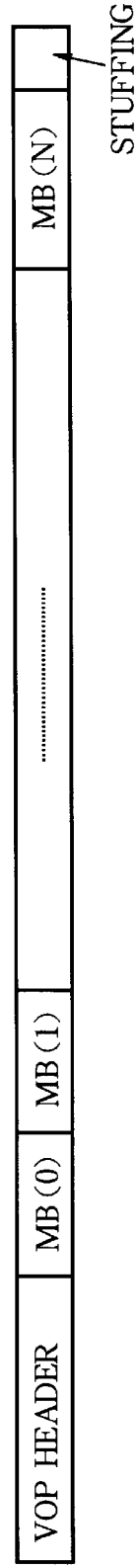

FIG. 2B is a diagram showing the internal structure of video packet VP(0) in FIG. 2A.

In the first video packet VP(0) of the one VOP, a VOP header is first added at the front; the coded data of one or more macroblocks MB(0) to MB(N) are arranged in sequence next; and finally stuffing bits are added for byte alignment, because the VOP header was added.

Figure 2C:

FIG. 2C is a diagram showing the internal structure of video packet VP(1) in FIG. 2A.

In video packet VP(1), which is output next after video packet VP(0), first, a Resync Marker comprising a fixed-length code with a particular bit pattern is added at the front to obtain correct decoding; next, a video packet (VP) header is added as the ID of video packet VP(1); then the coded data of one or more macroblocks MB(N+1) to MB(N) are output sequentially; and finally stuffing bits are added for byte alignment, because the VP header was added.

Figure 2D:
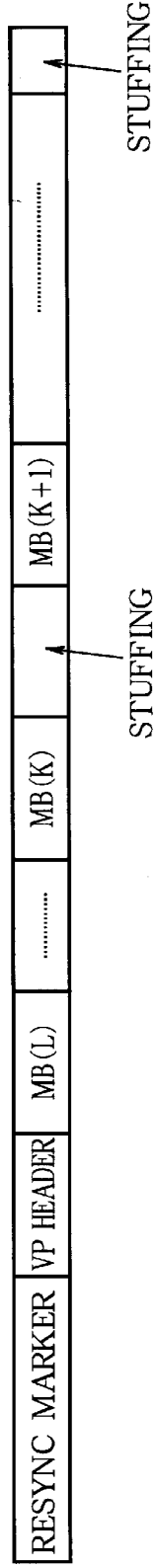

FIG. 2D is a diagram showing a structure that has stuffing in the interior of video packet VP(1) in FIG. 2C, for example.

In a video packet having stuffing in its structure, first, a Resync Marker is added at the front to obtain correct decoding; next, a VP header is added; then the coded data of one or more macroblocks MB(L) to MB(K) are output sequentially, stuffing is output, and once more, the coded data of one or more macroblock MB(K+1) are output sequentially; finally, stuffing bits are added for byte alignment, because the VP header was added. An arbitrary number of stuffings can thus be placed in the video packet. In MPEG-4 video, for example, stuffing is referred to as a stuffing macroblock, and can be placed in a video packet on the same footing as a normal macroblock. This stuffing, incidentally, is discarded in the decoding apparatus.

The number of macroblocks placed in a single video packet is arbitrary, as shown in FIGS. 2B to 2D, but if error propagation is considered, it is believed that the video packets should be structured so that their code length is substantially constant. In general, video packets corresponding to high-motion areas in a VOP have a large code length. To make the code length of each video packet substantially constant, accordingly, only a small area can correspond to one video packet in positions of large motion in a VOP, while a large area can correspond to one video packet in a position of small motion in the VOP.

Figure 3:
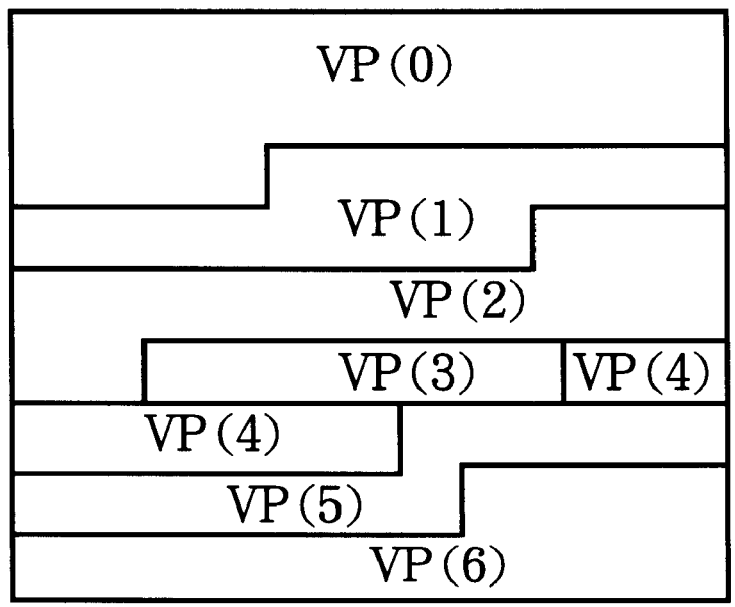
FIG. 3 is a diagram showing the area occupied by each video packet in a VOP when the code length of each video packet is substantially constant.

FIG. 3 is a diagram showing an example of the area occupied by each video packet in a VOP when the code length of each video packet is substantially constant.

In the VOP in FIG. 3, motion at the positions corresponding to video packets VP(3) and VP(4) is large, so the area is small. Conversely, motion at the positions corresponding to video packets VP(0) and VP(1) is small, so the area is large. Thus when the code length of each video packet is substantially constant, the area occupied by each video packet in the VOP is not constant.

The present embodiment rearranges data in the packet code-length control unit 52, between the temporary buffer 81 and the transmit buffer 84; the data rearrangement is carried out by a data partitioning process that will be described next.

Data partitioning is an art that improves error robustness by altering the transmission sequence of the information in a video packet. When an error occurs, the decoding side loses synchronization with the video packet after the error occurrence, and the data after the occurrence are not decoded correctly. Errors occur at random positions in the video packet, inconsistently, so data in positions toward the front of the video packet have a higher probability of being decoded than data in positions toward the back. Error robustness can accordingly be increased by placing more important data toward the front.

Data partitioning is therefore adapted to output the data after rearranging them so as to place particularly important data from each macroblock included in a video packet toward the front of the video packet, and place other information toward the back. That is, it alters the transmission sequence so that important data come near the front.

Besides placing important data near the front (in the front half) and other data near the back (in the back half), it also places a particular bit string between the data of the front half and back half, to enable the presence of errors in the important data in the front half to be determined. For an intra-VOP, this particular bit string is a (19-bit) DC marker; for an inter-VOP, it is a (17-bit) motion marker.

Figure 4:
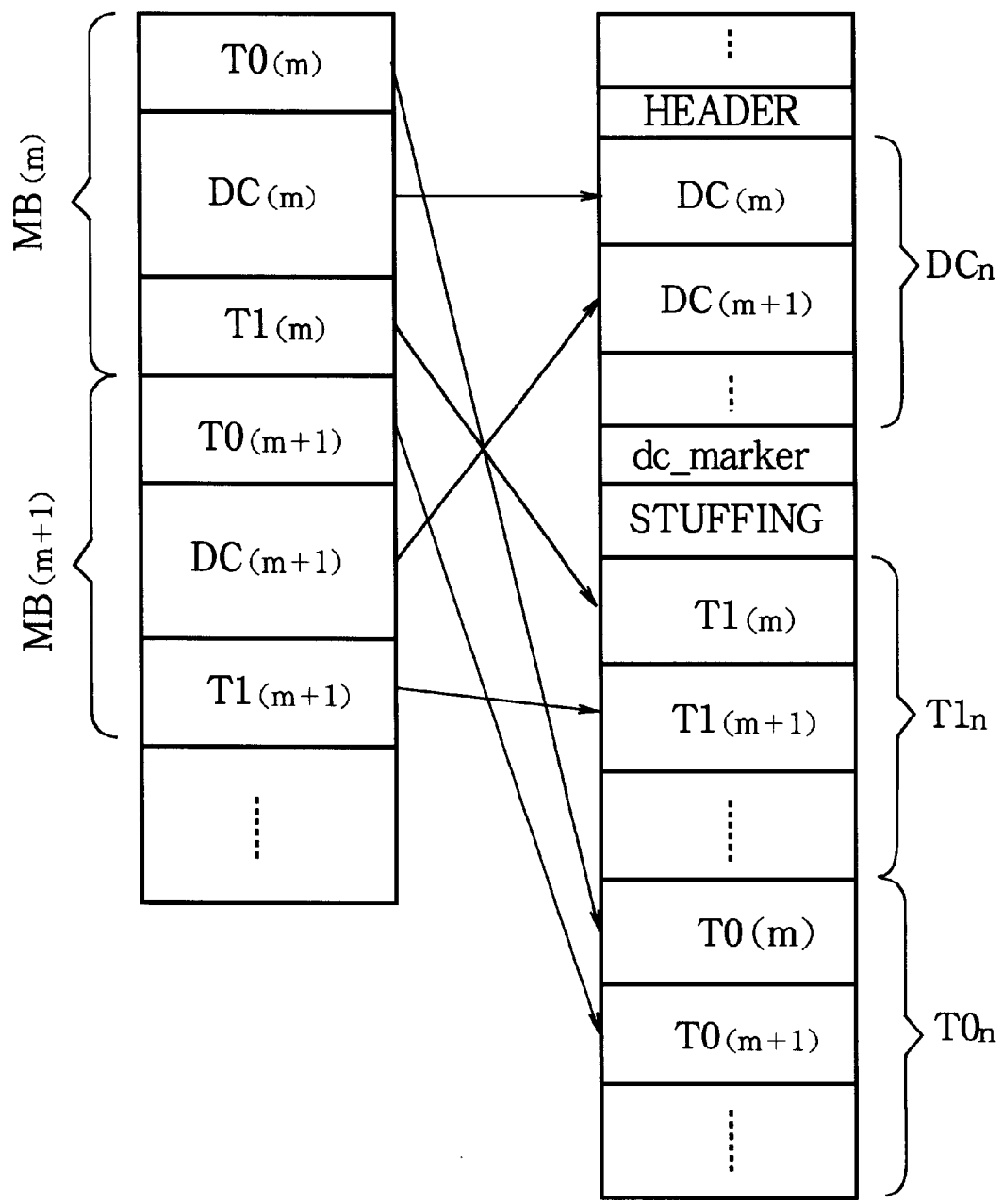
FIGS. 4A and 4B illustrate data partitioning for an intra-VOP.

FIGS. 4A and 4B illustrate data partitioning for an intra-VOP.

In the temporary buffer 81, the data of the intra-VOP are stored in macroblock order as shown in FIG. 4A: the m-th macroblock MB(m), then the (m+1)-th macroblock MB(m+1), and so on. In regard to the data structure in each macroblock MB, as also shown in FIG. 4A, for macroblock MB(m), there are the coefficient data T0(m) of each block in macroblock MB(m); information DC(m) such as the coding mode mcbpc needed for decoding the intra-DC components, the quantization difference values dquant indicating quantization parameters, and the DC components of the DCT coefficients of the blocks; and control information T1(m) such as the AC prediction flag ac_pred_flag indicating whether or not AC prediction was performed, which is necessary for decoding the AC components of the m-th macroblock MB, and the coding pattern cbpy indicating the presence or absence of non-zero AC coefficients of the luminance signal Y in each block. Similarly, the data structure of macroblock MB(m+1) comprises coefficient data T0(m+1), information DC(m+1), and control information T1(m+1).

When the data in the temporary buffer 81 are transferred to the transmit buffer 84, the information transmission sequence alteration circuit 83 executes data partitioning so that especially important data are placed in the front half. The result is that in the transmit buffer 84, DC(m), DC(m+1), and all the rest of the DC(n) information are disposed in the front half, as shown in FIG. 4B. Next, after a DC marker is added, T1(m), T1(m+1), and all the rest of the control information T1(n), which is comparatively important, are placed at the beginning of the back half, and T0(m), T0(m+1), and all the rest of the coefficient data T0(n) are placed at the end. A header is also added at the beginning of the video packet.

Figure 5:
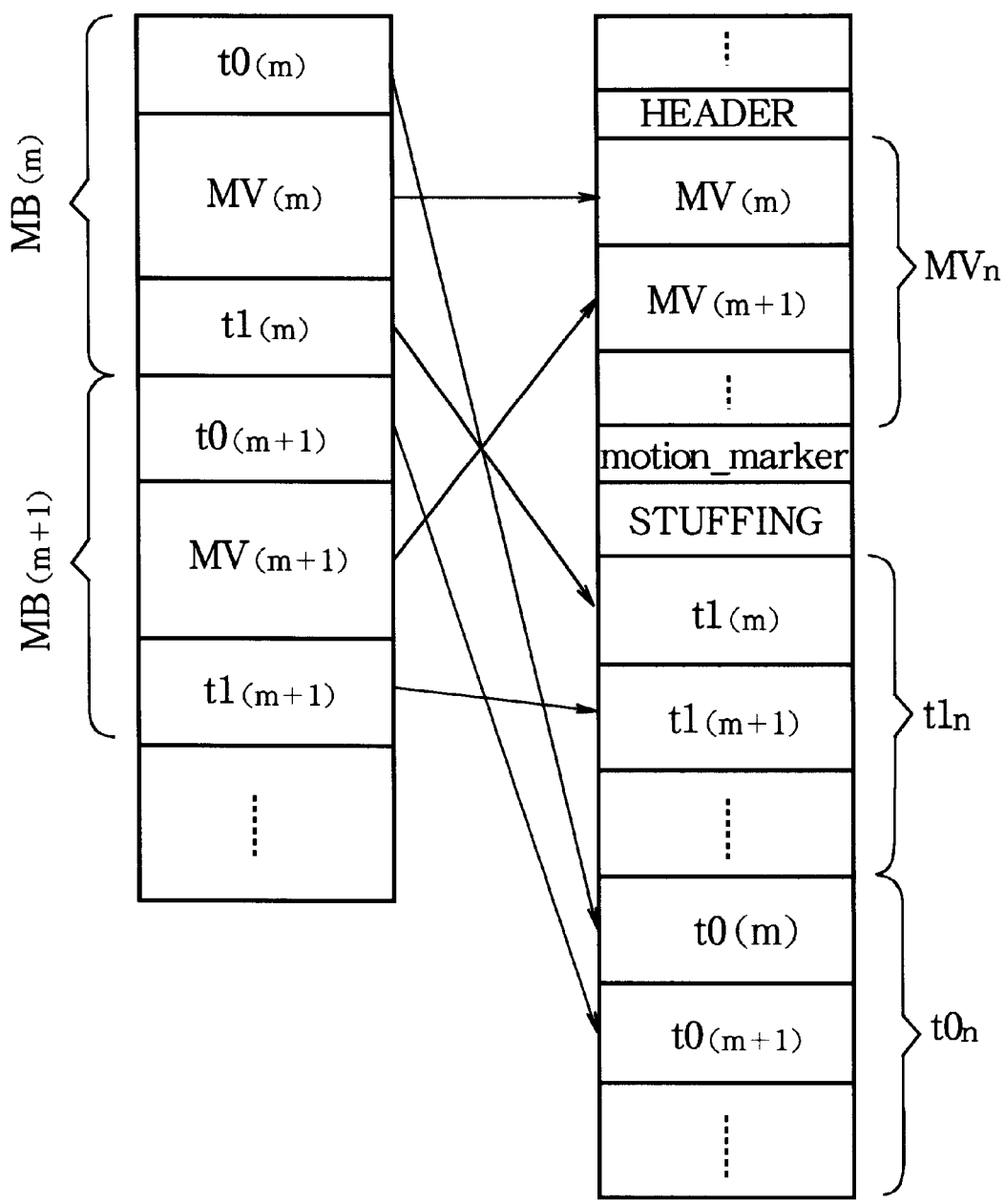
FIGS. 5A and 5B illustrate data partitioning for an inter-VOP.

FIGS. 5A and 5B illustrate data partitioning for an inter-VOP.

In the temporary buffer 81, the data of the inter-VOP are stored in macroblock order as shown in FIG. 5A: the m-th macroblock MB(m), then the (m+1)-th macroblock MB(m+1), and so on, similarly to the intra-VOP case, but the data structure within a macroblock differs from the intra-VOP case. The data structure in each macroblock MB comprises, as shown in FIG. 5A, for macroblock MB(m), the coefficient data t0(m) of each block in macroblock MB(m); information MV(m) needed for decoding the motion vector of the m-th MB, such as a not_coded flag indicating either a coded macroblock or a non-coded macroblock, the coding mode mcbpc needed for decoding the inter-DC components, and a motion vector; and control information t1(m) such as the coding pattern cbpy indicating the presence or absence of non-zero AC coefficients of the luminance signal Y in each block, and a quantization difference value dquant indicating a quantization parameter.

When inter-VOP data in the temporary buffer 81 are transferred to the transmit buffer 84, as in the intra-VOP case, the information transmission sequence alteration circuit 83 executes data partitioning so that especially important data are placed in the front half. The result is that in the transmit buffer 84, MV(m), MV(m+1), and all the rest of the MV(n) information are disposed in the front half, as shown in FIG. 5B. Next, after a motion marker is added, t1(m), t1(m+1), and all the rest of the control information t1(n), which is comparatively important, are placed at the beginning of the back half; and t0(m), t0(m+1), and all the rest of the coefficient data t0(n) are placed at the end. A header is also added at the beginning of the video packet.

The coefficient data T0(m), T0(m+1), t0(m), and t0(m+1) mentioned above are the run-length-coded coefficient data of each block, which are obtained as follows. For an MPEG-4 I-VOP, for example, first the AC components of the quantized DCT coefficients in each block in the macroblock are scanned one-dimensionally by a method such as zigzag scanning, and run-length coding is performed by coding a combination of a number of 0's and a non-zero coefficient. The run-length-coded coefficient data of each block are written into the temporary buffer 81 for each macroblock as the coefficient data shown in FIGS. 4A and 5A. The coding mode mcbpc is a coded combination of MTYPE, which indicates the type of macroblock, and CBPC, which indicates the presence or absence of non-zero AC coefficients in the color-difference blocks in the macroblock.

Next, the operation of the coding apparatus 51 will be described.

When intra-coding is performed, a prediction of coefficients from the quantized DCT coefficients is performed in the DC/AC prediction circuit 14, and up to the coding thereof, together with quantization parameters and other additional information, in the variable-length coding circuit 65, what takes place is similar to the conventional coding apparatus 1 shown in FIG. 8.

It is also similar to the conventional coding apparatus 1 shown in FIG. 8 when inter-coding is performed, up to the coding of the quantized DCT coefficients, together with motion vectors, quantization parameters, and other additional information.

The code-length control circuit 82 transfers the macroblocks stored in the temporary buffer 81 to the transmit buffer 84 in batches based on the code lengths of the macroblocks output from the variable-length coding circuit 65, so that the length of each video packet will be equal to or less than the value (MAXVPlen) of a predetermined maximum video-packet code length. In the present embodiment, when the macroblocks are transferred, a header is added at the beginning of the video packet, and they are rearranged in a bit-stream order determined by the data partitioning process, as shown in FIGS. 4B and 5B.

When the code-length control circuit 82 transfers the macroblocks stored in the temporary buffer 81 to the transmit buffer 84, it performs control so that the temporary buffer 81 does not underflow, or so that the VBV (Video Buffering Verifier, not visible) does not overflow, and decides where to divide the code sent from the temporary buffer 81 for use in video packets into macroblock units. The operation of deciding where to divide the code sent from the video packets will be detailed below, using the drawings.

Figure 6:
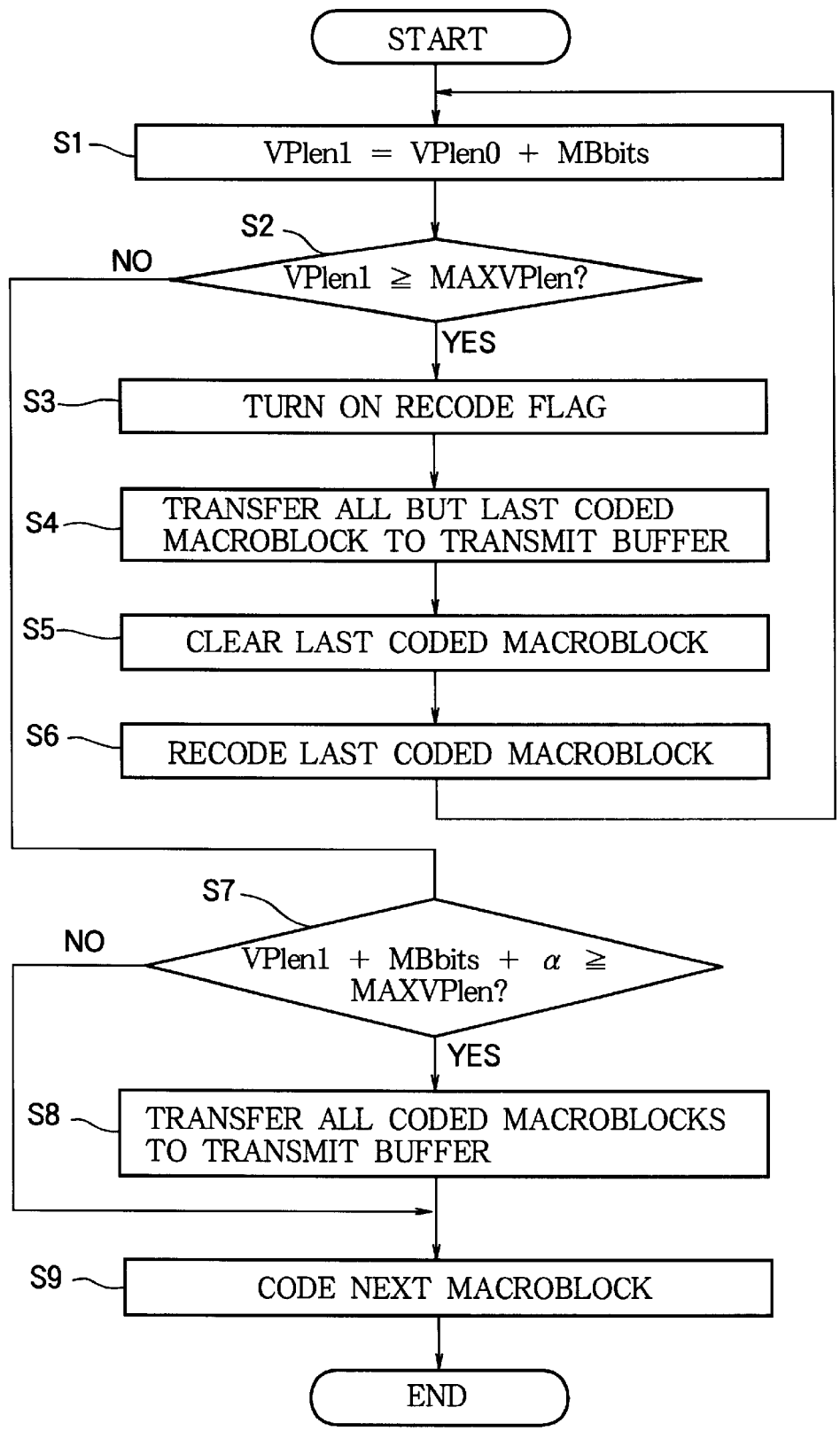
FIG. 6 is a flowchart of the operation of deciding where to divide the code for use in the video packets.

FIG. 6 is a flowchart of the operation, in the code-length control circuit 82, of deciding where to divide the code for use in the video packets.

The code-length control circuit 82 first calculates a code length VPlen1 by adding the code length MBbits of the macroblock coded this time and received from the variable-length coding circuit 65 to the code length VPlen0 of the macroblocks already coded, up to the previous time (step S1). It decides whether or not the code length VPlen1 resulting from the addition in step S1 is equal to or greater than the predetermined value MAXVPlen that limits the length of the video packets (step S2). If the code length VPlen1 is equal to or greater than the predetermined value MAXVPlen (step S2: Yes) it turns on the recode flag (step S3) and notifies the control circuit 73, to have the video signal data of this macroblock reprocessed.

In the reprocessing operation, which is controlled by the control circuit 73, first, the code of the macroblocks coded up to the time before (the previous time) and stored in the temporary buffer 81 is transferred to the transmit buffer for use in a video packet output in the bit stream this time (step S4). Regarding the code of the macroblock coded this time and stored in the temporary buffer 81, the stored contents are cleared (setting VPbits to 0) (step S5); regarding the video signals (DCT coefficients) of the macroblock coded this time, the processing in the DC/AC prediction circuit 14 and the processing in the variable-length coding circuit 65 are repeated (step S6). The transmit buffer 84, which receives the transferred code, outputs a video packet, to which such information as a resync marker and header has been added, in the bit stream. In inter-coding, the processing in the motion-vector prediction circuit 22 and the processing in the variable-length coding circuit 65 are repeated in step S6.

Thus when the code length VPlen1 is equal to or greater than the predetermined value MAXVPlen (step S2: Yes), the code up to the macroblock coded the previous time is accommodated in the video block this time, while the code of the macroblocks coded this time and thereafter is accommodated in a new video packet.

If the code length VPlen1 is less than the predetermined value VPlen in step S2 (step S2: No), the code-length control circuit 82 predicts that the code length of the next macroblock will be identical to the code length MBbits of the macroblock this time, calculates the predicted code length VPlen2 of the temporary buffer if the predicted code length MBbits of the next macroblock is added, and decides whether or not the predicted code length VPlen2 is equal to or greater than the predetermined value MAXVPlen (step S7). In the predicted code length VPlen2 in the present embodiment, variations in the code length of the next macroblock are dealt with by adding a prediction error tolerance $\alpha$(for example, $\alpha$=256) to the code length VPlen1 and the predicted code length MBbits of the next macroblock. If the code length VPlen2 is equal to or greater than the predetermined value MAXVPlen (step S7: Yes), then the code of all the macroblocks coded up to this time and stored in the temporary buffer 81 is transferred to the transmit buffer for use in the video packet output in the bit stream this time (step S8) The length VPlen1 of the code stored in the temporary buffer 81 is cleared, and the control circuit 73 is advised to perform the coding process for the video signal of the next macroblock (step S9). The transmit buffer 84, which receives the transferred code, outputs a video packet, to which such information as a resync marker and a header has been added, in the bit stream.

Thus if code length VPlen1 is less than the predetermined value MAXVPlen (step S2: No) and code length VPlen2 is equal to or greater than the predetermined value MAXVPlen (step S7: Yes), the code up to the macroblock coded this time is accommodated in the video packet this time, while the code of the macroblock coded next time and thereafter will be accommodated in a new video packet.

If the code length VPlen2 is less than the predetermined value MAXVPlen (step S7: No), the code length VPlen1 stored in the temporary buffer 81 is left as is, and the control circuit 73 is advised to perform the coding process for the video signal of the next macroblock (step S9), because it is anticipated that when the code length of the next macroblock is added to the code length VPlen1, the probability that the sum will be equal to or greater than the predetermined value MAXVPlen is small.

Thus if code length VPlen1 is less than the predetermined value MAXVPlen (step S2: No) and code length VPlen2 is less than the predetermined value MAXVPlen (step S7: No), the plan is to accommodate the code through the next coded macroblock in the video packet this time. The reason this is only a plan is that it is conceivable, although probabilistically unlikely, that this video packet will not accommodate the code, if the code length of the macroblock coded next time is much larger (more than the prediction tolerance α larger) than the code length of the macroblock coded this time.

Since the code-length control circuit 82 of the present embodiment decides where to divide the code for use in the video packets stored in the temporary buffer 81 as above, it may happen that the code-length prediction and coding of the next macroblock will have to be repeated because when the next macroblock is coded and added to the temporary buffer, the predetermined value is equaled or exceeded; but the frequency of this occurrence is reduced.

A further description, using the drawings, will be given concerning the point that the efficiency of the coding process is worsened when a situation arises in which code-length prediction and coding must be repeated.

Figure 7A:
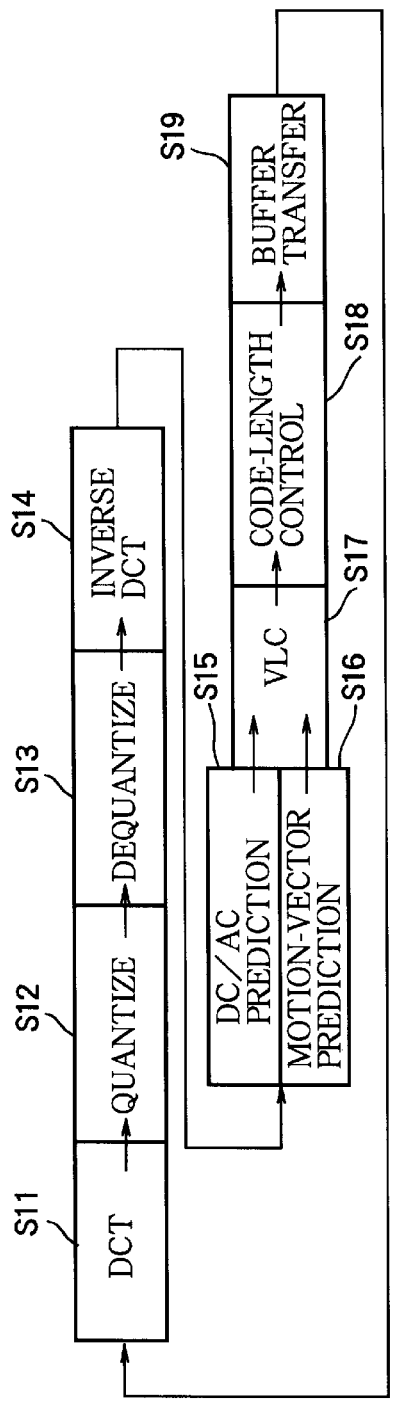
FIGS. 7A and 7B are a pair of flowcharts illustrating the processes performed by some of the circuits in FIG. 1 in step form.
Figure 7B:
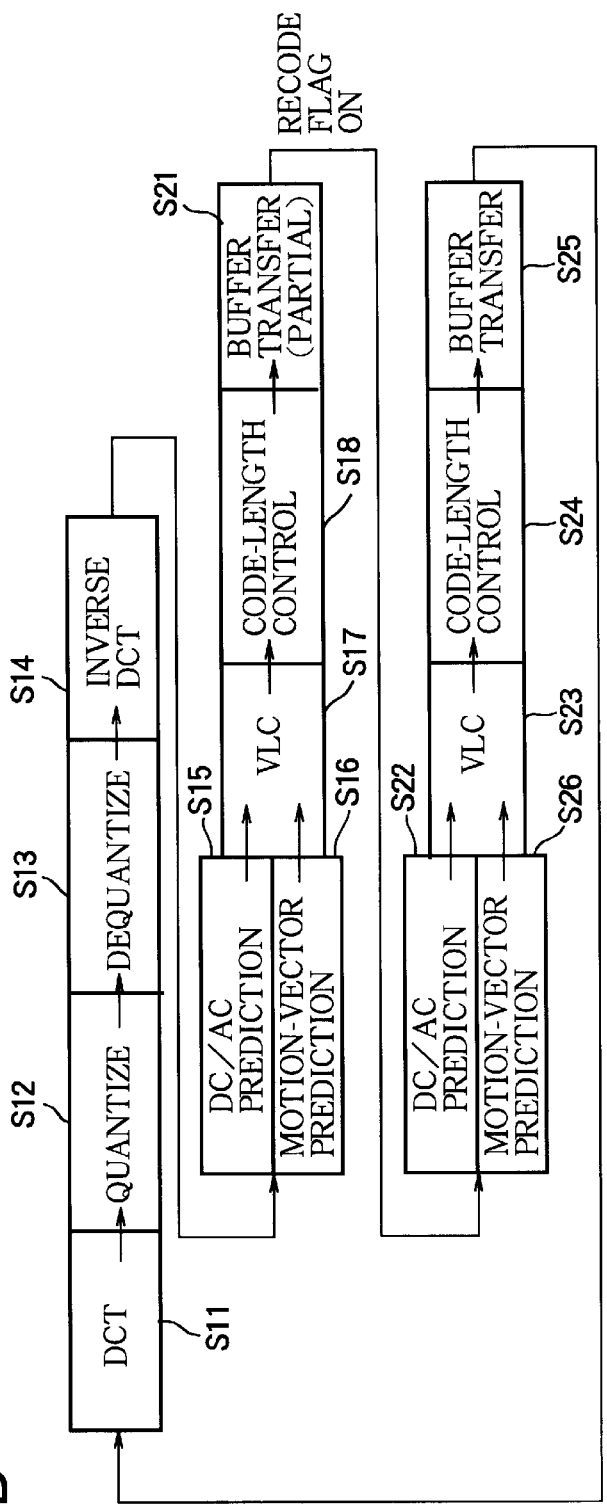

FIGS. 7A and 7B are a pair of flowcharts illustrating the processes performed in the DCT circuit 12, quantizing circuit 13, DC/AC prediction circuit 14, dequantizing circuit 16, inverse DCT circuit 17, motion-vector prediction circuit 22, variable-length coding circuit 65, temporary buffer 81, and code-length control circuit 82 in FIG. 1 in step form.

FIG. 7A is a flowchart of the case in which the coding of the macroblock is not repeated. This corresponds to the case of a No in step S2 in the flowchart in FIG. 6.

The video signals of the macroblock are DCT-processed, becoming DCT coefficients (step S1), and the DCT coefficients are quantized and output (step S12). The quantized DCT coefficients are used in the DC/AC prediction process (step S15), and also undergo dequantization (step S13), then an inverse DCT process (step S14). For inter-coding, a motion-vector prediction process is performed separately (step S16).

A variable-length coding process is executed from the DC/AC prediction result and the motion-vector prediction result (step S17), and a code-length control process is performed in regard to the code length coded and stored in the temporary buffer 81, as shown in the flowchart in FIG. 6 (step S18).

What takes place up to this step S18 is the same regardless of whether the coding process of the video signal of the macroblock is repeated or not, or regardless of the decision result when code length of the next macroblock is added, shown in step S7 in FIG. 6, but in regard to the transfer process of the stored contents of the temporary buffer 81, if step S7 in the flowchart in FIG. 6 gives a Yes, the code length up to the macroblock coded this time is transferred to the transmit buffer 84 (step S19), but if step S7 in the flowchart in FIG. 6 gives a No, the stored contents of the temporary buffer 81 are not transferred (step S19 is omitted), and a DCT process (step S11) is executed on the video signals of the macroblock to be coded next.

FIG. 7B is a flowchart of the case in which the coding of the macroblock is repeated. This corresponds to the case of a Yes in step S2 in FIG. 6.

As mentioned above, the operations through step S18 are similar to the case in which the coding process is not repeated, but when the coding is repeated, of the code length stored in the temporary buffer 81, that up to the code of the macroblock coded previously is transferred to the transmit buffer 84 (step S21). The transfer of step S21 is executed when step S2 in the flowchart in FIG. 6 gives a Yes. The code of the macroblock coded this time is cleared after being used in judging the code length as described above, and after the recode flag has been turned on; the cleared code is not used.

In regard to the video signals of the macroblock coded this time, due to the turning on of the recode flag, in the case of intra-coding, the DC/AC prediction process (step S22), the variable-length coding process (step S23), and the code-length control process (step S24) are executed. In the case of inter-coding, the motion-vector prediction process (step S26), the variable-length coding process (step S23), and the code-length control process (step S24) are executed. The code of the macroblock recoded this time is stored in the temporary buffer 81. If the result of the decision made in step S7 in FIG. 6 in the code-length control process in step S24 is Yes, this code is transferred to the transmit buffer 84 (step S25), but if step S7 in the flowchart in FIG. 6 gives a No, this code is left in the temporary buffer 81 (step S25 is omitted), and the DCT process (step S11) is executed on the video signals of the macroblock to be coded next.

From the above comparison of FIGS. 7A and 7B, it can be understood that the recoding of a macroblock that has already been coded greatly lowers the efficiency of the coding process. It is therefore important to reduce the frequency of the recoding process.

As noted above, however, in the conventional coding apparatus 1 shown in FIG. 8, recoding occurs frequently, because video packets are generated solely on the basis of a decision as to whether or not the code length is equal to or greater than a predetermined length.

In contrast thereto, the present embodiment predicts that the code length of the next macroblock will be similar to the code length of the current macroblock, and generates a video packet when there is a strong possibility that adding the code of the next macroblock will cause the code length stored in the temporary buffer 81 to exceed the code length that can be accommodated in a video packet; it can thus reduce the frequency of repeated coding of the next macroblock.

More specifically, since the code length that will be stored in the temporary buffer 81 if the code length of the macroblock coded next is added is predicted by the code-length control circuit 82 from the code length of the macroblock coded this time and stored in the temporary buffer 81, and since if the prediction result exceeds the code length that can be accommodated in a video packet, the code stored in the temporary buffer 81 is transferred to the transmit buffer before the video signals of the macroblock coded next are coded, when the video signals of the next macroblock are coded, the frequency of occurrence of situations in which the code length that can be accommodated in a video packet is exceeded and the coding of the video signals of the next macroblock must be repeated can be reduced. Accordingly, the lowering of the coding efficiency of the coding apparatus 51 of the present embodiment can be curbed.

The frequency of repeated coding of all macroblocks can be reduced in this way, because each time a macroblock is coded, the code-length control circuit 82 of the present embodiment can have the code length of the temporary buffer calculated by predicting that the code length of the macroblock coded next and the code length of the macroblock coded this time will be the same. The lowering of coding efficiency can therefore be strongly curbed.

In the packet code-length control unit 52 of the present embodiment, the code output from the temporary buffer 81 undergoes data partitioning by use of the information transmission sequence alteration circuit 83 .before being accommodated in the transmit buffer 84, and is generated as a video packet in the transmit buffer 84, so through the use of the data-partitioning temporary buffer 81 and transmit buffer 84, the elements newly added for control of the present invention can be held to a minimum, and by data partitioning, the error robustness of the video packets output in the bit stream from the transmit buffer 84 can be enhanced.

In the above embodiment, an example that controls the code length transferred from the temporary buffer to the transmit buffer when data partitioning of the MPEG-4 standard is performed has been described, but the frequency of repeated coding can also be reduced if data partitioning is not executed when the video packets are generated, or even in the case of an H.263-standard coding apparatus or the like, if there is a restriction in length in the video packets, by use of a code-length control circuit to control the code length transferred from the temporary buffer to the transmit buffer as described above.

In this case, it can also be applied to cases that perform prediction of an arbitrary DCT coefficient in a video packet, e.g., using a DC prediction that predicts the DC comoponent only from the DC comoponent of the left adjacent block, as in MPEG-2.

The frequency of repeated coding can also be reduced, with the same configuration, in cases that perform a prediction of transform coefficients, within the video packet, using a wavelet transform or another orthogonal transform other than the DCT.

The frequency of repeated coding can also be reduced when the picture format of the video signal input to the coding apparatus is not 4:2:0, or when the VOPs are not rectangular, because the use of a code-length control circuit to control the code length transferred from the temporary buffer to the transmit buffer can be applied as in the present embodiment.

As the method of predicting the code length of the video signals of the macroblock coded next, in the present embodiment it was predicted as being identical to the code length of the video signals of the macroblock coded this time (within the range of a prediction error tolerance $\alpha$), but it is also possible to apply, for example, a method that predicts separate fixed values for I-VOPs and P-VOPs, a method that finds the average value of the code lengths when the video signals of the preceding N macroblocks were coded, or a method that uses the result of a certain operation on the code length of the video signals of the current macroblock (for example, code-length*$\alpha$+$\beta$, where $\beta$ and $\alpha$ are arbitrary values).

In the embodiment described above, a prediction error tolerance $\alpha$ of two hundred fifty-six was mentioned, but needless to say, this value can be altered arbitrarily.

According to one aspect of the invention, the code length of the temporary buffer when the code length of the macroblock coded next is added is predicted by the code-length control circuit from the code length of a macroblock that is intra-coded this time and stored in the temporary buffer, and the code stored in the temporary buffer is transferred to the transmit buffer before the coding of the macroblock that is coded next time, so when the video signals of the next macroblock are coded, the frequency of repeated coding because the code length that can be accommodated in a video packet was exceeded can be reduced, and the lowering of coding efficiency can be reduced.

According to another aspect of the invention, the code length of the temporary buffer when the code length of the macroblock coded next is added is predicted by the code-length control circuit from the code length of a macroblock that is inter-coded this time and stored in the temporary buffer, and the code stored in the temporary buffer is transferred to the transmit buffer before the coding of the macroblock that is coded next time, so when the video signals of the next macroblock are coded, the frequency of repeated coding because the code length that can be accommodated in a video packet was exceeded can be reduced, and the lowering of coding efficiency can be reduced.

According to yet another aspect of the invention, each time the video signals of a macroblock are coded, the code length of the temporary buffer is calculated by predicting that the code length of the video signals of the macroblock coded next time and the code length of the video signals of the macroblock coded this time will be identical, so the frequency of repeated coding can be reduced for the video signals of all macroblocks, and the lowering of coding efficiency can be reduced.

According to still another aspect of the invention, the code output from the temporary buffer undergoes data partitioning before being generated as a video packet, so the elements newly added for the control of the present invention can be held to a minimum by use of the temporary buffer and transmit buffer employed for data partitioning, and the error robustness of the video packets can be enhanced.

Those skilled in the art will recognize that the above embodiment can be modified in various ways within the scope of the invention claimed below.

What is claimed is:

1. A method of coding video signals of a plurality of macroblocks for output in video packets of limited length, comprising the steps of:
   (a) coding each macroblock by using a variable-length code, thereby generating successive coded macroblocks;
   (b) storing each coded macroblock in a buffer;
   (c) calculating a resulting total code length of the coded macroblocks stored in the buffer, as each coded macroblock is stored in the buffer;
   (d) comparing said total code length with a predetermined value related to the limited length of the video packets;
   (e) outputting all of the coded macroblocks stored in the buffer, except the coded macroblock coded most recently, for use as a video packet, and causing the macroblock coded most recently to be coded again, if said total code length exceeds said predetermined value;
   (f) calculating a predicted code length of a next coded macroblock if said total code length is less than said predetermined value;
   (g) adding the predicted code length to said total code length and comparing a resulting sum with said predetermined value; and
   (h) outputting all of the coded macroblocks stored in the buffer for use as a video packet if said resulting sum exceeds said predetermined value.

2. The method of claim 1, further comprising the steps of:
   (i) predicting contents of a macroblock from contents of macroblocks now stored as coded macroblocks in the buffer;

(j) finding a difference between the predicted contents and actual contents of the macroblock;

(k) using said difference for variable-length coding of the macroblock in said step (a); and (l) repeating said steps (i), (j), and (k) if the macroblock is coded again pursuant to said step (e).

3. The method of claim 1, further comprising the steps of:

(m) predicting a motion vector of a macroblock from motion vectors of macroblocks now stored as coded macroblocks in the buffer;

(n) finding a difference between the predicted motion vector and an actual motion vector of the macroblock;

(o) using said difference for variable-length coding of the macroblock in said step (a); and (p) repeating said steps (m), (n), and (o) if the macroblock is coded again pursuant to said step (e).

4. The method of claim 1, wherein the predicted code length calculated in said step (f) is equal to the code length of the macroblock coded most recently.

5. The method of claim 1, further comprising the step of rearranging the coded macroblocks output from the buffer in said steps (e) and (h), by performing data partitioning.

6. A coding apparatus that codes video signals of a plurality of macroblocks for output in video packets of limited length, comprising:

a variable-length coding circuit that generates coded macroblocks with variable code lengths;

a buffer coupled to the variable-length coding circuit, that temporarily stores the coded macroblocks for output as video packets; and a code-length control circuit, coupled to the buffer, that, as each coded macroblock is stored in the buffer, calculates a resulting total code length of the coded macroblocks stored in the buffer, compares the total code length with a predetermined value related to the limited length of the video packets, calculates a predicted code length of a next coded macroblock if said total code length is less than said predetermined value, adds the predicted code length to said total code length and compares a resulting sum with said predetermined value, outputs all of the coded macroblocks stored in the buffer for use as a video packet if said resulting sum exceeds said predetermined value, and if said total code length exceeds said predetermined value, outputs all of the coded macroblocks stored in the buffer except the coded macroblock coded most recently for use as a video packet, and causes the macroblock coded most recently to be coded again.

7. The coding apparatus of claim 6, further comprising a prediction circuit that predicts contents of a macroblock from contents of macroblocks now stored as coded macroblocks in the buffer, finds a difference between the predicted contents and actual contents of the macroblock, supplies the difference to the variable-length coding circuit, and if the macroblock is coded again, predicts the contents of the macroblock again.

8. The coding apparatus of claim 6, further comprising a motion-vector prediction circuit that predicts a motion vector of a macroblock from motion vectors of coded macroblocks now stored in the buffer, finds a difference between the predicted motion vector and an actual motion vector of the macroblock, supplies the difference to the variable-length coding circuit, and if the macroblock is coded again, predicts the motion vector of the macroblock again.

9. The coding apparatus of claim 6, wherein the code-length control circuit predicts that the code length of each said next macroblock will be equal to the code length of the most recently coded macroblock.

10. The coding apparatus of claim 6, further comprising an information transmission sequence alteration circuit that rearranges the coded macroblocks output from the buffer, by performing data partitioning.

* * * * *